United States Patent Office 3,378,568
Patented Apr. 16, 1968

3,378,568
METHOD FOR MAKING SULFUR-CONTAINING PHTHALOCYANINE DYESTUFFS
Wilson J. Bryan, Jr., Charlotte, and William S. Griffith, Mount Holly, N.C., assignors to Martin-Marietta Corporation, a corporation of Maryland
No Drawing. Filed Dec. 20, 1965, Ser. No. 515,192
3 Claims. (Cl. 260—314.5)

ABSTRACT OF THE DISCLOSURE

There is disclosed herein a method for making vattable, sulfur-containing dyestuffs of the phthalocyanine series, comprising heating phthalocyanine sulfinates, copper phthalocyanine sulfinates or nickel phthalocyanine sulfinates, in which the sulfinate groups are pendant and are substituents for hydrogen in the arylene nuclei of the phthalocyanines, with $X_2S_2O_3$ or sodium polysulfides, wherein X is Na, K or $NH_4$. The phthalocyanines may contain in addition pendant thiolsulfonate groups or pendant sulfonate groups. Solubilization of the resulting dye to its leuco form with sodium sulfide, and production of wet-fast green dyeings with the dyestuff on cotton fabric is also disclosed.

---

The present invention relates to dyestuffs, and more particularly to a method for making vattable, sulfur-containing dyestuffs of the phthalocyanine series which are soluble in aqueous sodium sulfide.

Generally speaking, the method of the present invention is a process for making vattable, sulfur-containing dyestuffs of the phthalocyanine series, which comprises heating a sulfinate of the phthalocyanine series selected from the group consisting of phthalocyanine sulfinates, copper phthalocyanine sulfinates and nickel phthalocyanine sulfinates, in which the sulfinate groups are pendant and are substituents for hydrogen in the arylene nuclei of the phthalocyanines, with a member selected from the group consisting of $X_2S_2O_3$ and sodium polysulfides, wherein X is a member selected from the group consisting of Na, K and $NH_4$.

The sulfinates of the phthalocyanine series may also contain pendant thiolsulfonate groups or pendant sulfonate groups in addition to the pendant sulfinate groups.

The dyestuffs of the present invention may be solubilized to their leuco form with aqueous sodium sulfide, and the leuco may be padded onto cotton fabric, dried, and subsequently oxidized to make valuable wet-fast green dyeings.

The method of the present invention has a number of advantages. For example, it is economical in that relatively inexpensive materials may be selected as starting products; $Na_2S_2O_3$ is a preferred reactant and is readily available in quantity as a difficultly disposable waste product at sulfur dye plants. Further economies and safety result because the reaction may be conducted rapidly in aqueous medium using non-corrosive and stable reactants, without any necessity for expensive solvents or glass-lined equilibrium. Moreover, the final product is easily isolated from the other end products. Additional advantages will become apparent from the following detailed description.

The starting sulfinate is a sulfinate of the phthalocyanine series selected from the group consisting of phthalocyanine sulfinates, nickel phthalocyanine sulfinates and copper phthalocyanine sulfinates, in which the sulfinate groups are pendant and are substituents for hydrogen in the arylene nuclei of the phthalocyanines.

The phthalocyanine sulfinates may also contain pendant thiolsulfonate or pendant sulfonate groups, which are also substituents for hydrogen in the arylene nuclei of the phthalocyanines, in addition to the pendant sulfinate groups.

Examples of sulfinates of the phthalocyanine series which are suitable for use in the method of the present invention are those disclosed in British patent specification No. 960,643, published June 10, 1964.

However, for reasons of economy it is preferred to use sulfinates of the phthalocyanine series of the formula

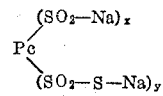

which may be prepared by a process comprising the step of reducing $Pc(SO_2Cl)_n$ in aqueous medium at pH 4–10 with an excess of NaSH or $Na_2S$, wherein Pc is the radical of phthalocyanine, copper phthalocyanine or nickel phthalocyanine, $x$ is a number from 1.2–2.3, $y$ is a number from 0.8–2.3, $n$ is a number from 2–4, and $x+y=n$.

The phthalocyanine sulfinate is preferably dissolved in water, for reasons of economy. However, a suitable organic solvent may be used, but will be more expensive. Suitable organic solvents are those in which the reactants are soluble, which do not react with the reactants, and which do not boil at less than 140° C. under the reaction conditions. If an organic solvent is selected, it is desirable that the solvent be one in which the final product is insoluble, for ease in isolating the product.

$Na_2S_2O_3$, $K_2S_2O_3$, $(NH_4)_2S_2O_3$, or a sodium polysulfide is then added to the solution of the phthalocyanine sulfinate. It is suggested that an excess of the thiosulfate compound or the sodium polysulfide be used; by excess it is meant that more than the theoretical amount required to complete the reaction be employed. A suitable range would be about 4–8, and preferably 5, gram molecular weights of the thiosulfate per gram molecular weight of the phthalocyanine sulfinate selected multiplied by the sum of the sulfinate and thiolsulfonate groups per molecule of phthalocyanine; when sodium polysulfide is employed, reduce the above 4–8, and preferably 5, to 1–2, and preferably 1.25. For example, if 1 g.m.w. of

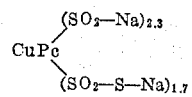

wherein CuPc is the radical of copper phthalocyanine, were employed, 16–32, and preferably 20, g.m.w. of $Na_2S_2O_3$ would be used; or 4–8, and preferably 5, g.m.w. of a sodium polysulfide could be substituted for the $Na_2S_2O_3$.

It is suggested that the pH of the composition for the reaction be 7–10, as lower pH results in undesirable sulfur precipitation. The composition for the reaction will usually be within this pH range, but if not an alkali or acid binding agent, such as NaOH, $Na_2S$, or $Na_2CO_3$ can be employed to adjust the pH to the desired range.

The reaction is conducted at an elevated temperature, preferably within the range of about 140°–180° C. If water is used as the solvent, about 38–170 p.s.i.g. pressure results when the desired temperature is obtained, and therefore the reaction should be conducted in a sealed pressure vessel. If organic solvents are used, a desirable reaction temperature may be obtained at atmospheric pressure.

The composition is heated until the phthalocyanine sulfinate has been converted into the vattable, sulfur-containing dyestuff of the phthalocyanine series. The dyestuffs of the present invention are vattable from an aqueous sulfide solution thereof. The length of time during which the composition is heated depends, of course, on the temperature employed. In general, heating may be from about 10 minutes–2 hours. The reaction is substantially complete within a few minutes, but heating may continue for a longer period to insure completion of reaction. Completion of the reaction is indicated by precipitation of the product.

Following completion of the reaction, the product is isolated as solids, for example, the slurry containing the product is cooled below 50° C., the product collected in solids form by filtration, and the solids washed with water at room temperature and dried.

The product may be marketed as solids, or it may be reduced to the leuco form with aqueous $Na_2S$ and marketed as a concentrated pre-reduced liquid dye.

It is believed that the product is a phthalocyanine polymer containing disulfide or polysulfide linkages, and may be represented by the formula

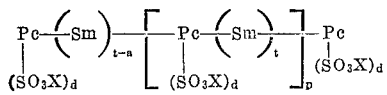

wherein Pc and X are as above defined; $m$ is the number of S atoms in each polysulfide unit; $t$ is a number from 1 through 4; $d$ is zero or the number of sulfonate groups per Pc; $p$ is the number of non-terminal Pc units; $a$ is 1–3 and less than $t$; and the sum of $t+d$ is not greater than 4. It is possible that bridging members, for example $SO_2$ or SO, may be interposed between some or all of the Pc and $Sm$ groups or units. However, all of the foregoing belief is theory to which we do not wish to be bound.

The following are illustrative examples for preparing the green phthalocyanine dyes of the present invention.

EXAMPLE 1

An aqueous solution of a water soluble copper phthalocyanine sulfinate of the formula

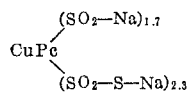

wherein CuPc is the radical of copper phthalocyanine, is prepared by slurrying 97 gms. copper phthalocyanine tetra-(3)-sulfonyl chloride with ice and water to 960 ml. volume at 0° C., adjusting the pH to 7 by adding 15% aqueous NaOH at room temperature to the cold mass, adding 3 drops tributyl phosphate anti-foaming agent, adding 77.9 gms. 43% aqueous NaSH solution at room temperature, warming to room temperature over 1 hour, and stirring 3 additional hours.

The resulting solution is transferred to a pressure reaction vessel, and 496 gms. $Na_2S_2O_3 \cdot 5H_2O$ are added thereto. The resulting solution is heated at 175°–180° C. for 1 hour in a sealed vessel, during which the pressure rises to 120–150 p.s.i.g. The resulting slurry is cooled to below 50° C., the solids product recovered by filtration, washed with water at room temperature and dried.

EXAMPLE 2

97 gms. copper phthalocyanine tetra-(4)-sulfonyl chloride are stirred with ice and water to 600 ml. volume at 0° C., and 3 drops tributyl phosphate are added. The pH is adjusted to 5 by adding 15% aqueous NaOH at room temperature to the cold mass. 69.1 gms. $Na_2S$ dissolved in 300 ml. water at room temperature, and enough ice to maintain the mass at 0° C. during addition of the $Na_2S$, are added. The mass is stirred 12–15 hours while permitting it to warm to room temperature naturally. An aqueous solution of

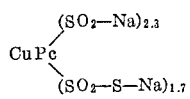

wherein CuPc is the radical of copper phthalocyanine, results.

The pH of the above aqueous solution is adjusted to 7 with HCl or $NH_4OH$ as required. 474 gms. $(NH_4)_2S_2O_3$ is added thereto, and the resulting solution heated in a sealed vessel for 10 hours at 140° C. The resulting slurry is cooled below 50° C., the solids product collected by filtration, washed with water at room temperature and dried.

EXAMPLE 3

An aqueous solution of

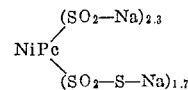

is prepared in the same manner as in Example 2 above, except that 96.5 gms. nickel phthalocyanine tetra-(3)-sulfonyl chloride is substituted for the copper phthalocyanine tetra-(4)-sulfonyl chloride used in Example 2.

The pH of the above aqueous solution is adjusted to 8 with KOH or HCl as required, 334 gms. $K_2S_2O_3 \cdot H_2O$ added thereto, and the resulting solution heated in a sealed vessel for 2 hours at 180° C. The resulting slurry is cooled below 50° C., the solids product collected by filtration, washed with water at room temperature, and collected as moist press cake for subsequent conversion with aqueous $Na_2S$ to a water soluble, concentrated, prereduced, liquid dye.

EXAMPLE 4

An aqueous solution of

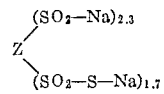

wherein Z is the radical of phthalocyanine, is prepared in the same manner as disclosed in Example 2 above, except that 90.65 gms. phthalocyanine tetra-(4)-sulfonyl chloride are substituted for the copper phthalocyanine tetra-(4)-sulfonyl chloride used in Example 2.

The pH of the above aqueous solution is adjusted to 9 with NaOH or HCl as required, 35% aqueous $Na_2S_5$ added thereto, and the resulting solution heated in a sealed vessel for 30 minutes at 180° C. The resulting slurry is cooled below 50° C., the solids product collected by filtration, washed with water at room temperature and dried.

EXAMPLE 5

84.2 gms. of the dried copper phthalocyanine sulfinic acid having an average of 3.4 sulfinic acid groups per molecule is prepared according to Example 4 of British patent specification No. 960,643, published June 10, 1964, powdered, blended with enough $Na_2CO_3$ solids so that a 10% aqueous solution thereof would have pH 10, dissolved to a volume of 1,000 ml. with water, 354 gms. $K_2S_2O_3 \cdot H_2O$ is added, and the resulting solution is heated in a sealed vessel 1 hour at 175° C. The resulting slurry is cooled below 50° C., the solids product collected by filtration, washed with water at room temperature and dried.

EXAMPLE 6

83.7 gms. of dried nickel phthalocyanine sulfinic acid having an average of 3.4 sulfinic acid groups per molecule is prepared according to Example 4 of British patent specification No. 960,643, published June 10, 1964, except that 9.65 parts nickel phthalocyanine tetra-(4)-sulfonyl chloride are substituted for the 9.7 parts copper phthalocyanine tetra-(3)-sulfonyl chloride used therein.

The dried nickel phthalocyanine sulfinic acid is powdered, blended with enough $Na_2CO_3$ solids so that a 10% aqueous solution thereof would have pH 7, dissolved to 800 ml. volume with water, and 252 gms. $(NH_4)_2S_2O_3$ is added thereto. The resulting solution is heated in a sealed vessel 1 hour at 170°–175° C., and the resulting slurry is cooled below 50° C., the solids product collected by filtration, washed with water at room temperature, and dried.

EXAMPLE 7

78 gms. dried phthalocyanine sulfinic acid having an average of 3.4 sulfinic acid groups per molecule is prepared according to Example 4 of British patent specification No. 960,643, published June 10, 1964, except that 9.09 parts phthalocyanine tetra-(3)-sulfonyl chloride is substituted for the 9.7 parts copper phthalocyanine tetra-(3)-sulfonyl chloride used therein.

The dried phthalocyanine sulfinic acid is dissolved in water with enough NaOH to give final volume of 1,000 ml. and pH 8; 421 gms. $Na_2S_2O_3 \cdot 5H_2O$ is added thereto, and the resulting solution is heated in a sealed vessel for 4 hours at 150° C. The resulting slurry is cooled below 50° C., the solids collected by filtration, washed with water at room temperature and dried.

EXAMPLE 8

83.7 gms. dried nickel phthalocyanine sulfinic acid having an average of 3.4 sulfinic acid groups per molecule is prepared according to Example 6 above.

The dried nickel phthalocyanine sulfinic acid is powdered, blended with enough $Na_2CO_3$ solids so that a 10% aqueous solution thereof would have pH 8, dissolved to 700 ml. volume with water, and 134.5 gms. 44% aqueous $Na_2S_4$ is added thereto. The resulting solution is heated in a sealed vessel 3 hours at 180° C.; the resulting slurry is cooled below 50° C., the solids product collected by filtration, washed with water at room temperature, and dried.

EXAMPLE 9

An aqueous solution of

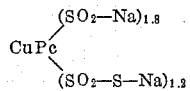

wherein CuPc is the radical of copper phthalocyanine, is prepared by stirring 87.15 gms. copper phthalocyanine tri-(3)-sulfonyl chloride with ice and water to 900 ml. volume at 0° C., and 3 drops tributyl phosphate are added. The pH is adjusted to 7 by adding 15% aqueous NaOH at room temperature to the cold mass. 51.9 gms. of 43% aqueous NaSH solution at room temperature is added to the cold mass, and the mass is stirred 12–15 hours while being permitted to warm to room temperature naturally.

To the resulting solution is added 152 gms. 25% aqueous $Na_2S_2$, and the resulting solution is heated in a sealed vessel 1 hour at 145° C.; the resulting slurry is cooled below 50° C., the solids product collected by filtration, washed with water at room temperature, and dried.

EXAMPLE 10

This example is the same as Example 9 above, except that 86.7 gms. nickel phthalocyanine tri-(4)-sulfonyl chloride is substituted for the copper phthalocyanine tri-(3)-sulfonyl chloride used in Example 9, and except that 372 gms. $Na_2S_2O_3 \cdot 5H_2O$ is substituted for the aqueous $Na_2S_2$ used in Example 9.

EXAMPLE 11

This example is the same as Example 9 above, except that 80.1 gms. phthalocyanine tri-(3)-sulfonyl chloride is substituted for the copper phthalocyanine tri-(3)-sulfonyl chloride used in Example 9, and except that 312 gms. $K_2S_2O_3 \cdot H_2O$ is substituted for the aqueous $Na_2S_2$ used in Example 9.

EXAMPLE 12

This example is the same as Example 11 above, except that 213 gms. 25% aqueous $Na_2S_3$ is substituted for the $K_2S_2O_3 \cdot H_2O$ used in Example 11.

EXAMPLE 13

78.4 gms. of dried copper phthalocyanine sulfinic acid having 2 sulfinic acid groups per molecule is prepared according to Example 1 of British patent specification No. 960,643, published June 10, 1964, powdered, and blended with enough dry $Na_2CO_3$ so that a 10% aqueous solution thereof would have pH 7.

The dry blend is dissolved to 800 ml. volume with water, and 99 gms. 44% aqueous $Na_2S_4$ is added thereto. The resulting solution is heated in a sealed vessel for 1 hour at 175° C., and the resulting slurry is cooled below 50° C., the solids product collected by filtration, washed with water at room temperature, and dried.

EXAMPLE 14

78.9 gms. of dried nickel phthalocyanine sulfinic acid having 2 sulfinic acid groups per molecule is prepared in the manner described in Example 1 of British patent specification No. 960,643, published June 10, 1964, except that 12.8 parts of nickel phthalocyanine tri-(3)-sulfonyl chloride mono-(3)-sulfonic acid is substituted for the 12.9 parts copper phthalocyanine tri-(3)-sulfonyl chloride mono-(3)-sulfonic acid used in the British patent.

The dried nickel phthalocyanine sulfinic acid is powdered, blended with enough $Na_2CO_3$ solids so that a 10% aqueous solution thereof would have pH 7, dissolved with water to 800 ml. volume, and 142 gms. 25% aqueous $Na_2S_3$ is added thereto. The resulting solution is heated in a sealed vessel 1 hour at 180° C., and the resulting slurry is cooled below 50° C., the solids product collected by filtration, washed with water at room temperature, and dried.

EXAMPLE 15

79.2 gms. of the copper phthalocyanine sulfinic acid having an average of 1.5 sulfinic acid groups per copper phthalocyanine molecule is prepared according to Example 6 of British patent specification No. 960,643, published June 10, 1964.

The dried copper phthalocyanine sulfinic acid is powdered and blended with enough $Na_2CO_3$ solids so that a 10% aqueous solution thereof would have pH 7. The blend is dissolved to 900 ml. volume with water, and 185.5 gms. $Na_2S_2O_3 \cdot 5H_2O$ is added thereto. The resulting solution is heated in a sealed vessel for 3 hours at 160° C., and the resulting slurry is cooled below 50° C., the solids product collected by filtration, washed with water at room temperature, and dried.

EXAMPLE 16

An aqueous solution of

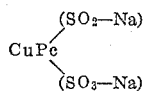

wherein CuPc is the radical of copper phthalocyanine, is prepared by adding 77.3 gms. copper phthalocyanine di-(3)-sulfonyl chloride to a stirring solution of 50.5 gms. sodium sulfite in 500 ml. water maintained at 20°–30° C. during the addition and also maintained at pH 9–9.5 by adding soda ash as required. The resulting solution is stirred 10 hours at room temperature. 75 gms. NaCl is added, and enough concentrated HCl to precipitate the sulfinate as a sulfinic acid. The sulfinic acid is collected by filtration, washed with 300 ml. 5% aqueous HCl, and collected as moist press cake.

The moist press cake is dissolved in water with addition of enough NaOH to give pH 9 and a volume of 900 ml. 88 gms. 35% aqueous $Na_2S_5$ is added thereto, and the solution is heated in a sealed vessel 1 hour at 170° C. The resulting slurry is cooled below 50° C., the solids product collected by filtration, washed with water at room temperature and dried.

EXAMPLE 17

This example is the same as Example 16 above, except that 76.8 gms. nickel phthalocyanine di-(4)-sulfonyl chloride is substituted for the copper phthalocyanine di-(3)-sulfonyl chloride used in Example 16, and except that 124 gms. Na₂S₂O₃·5H₂O is substituted for the aqueous Na₂S₅ used in Example 16.

EXAMPLE 18

This example is the same as Example 16 above, except that 71.2 gms. phthalocyanine di-(3)-sulfonyl chloride is substituted for the copper phthalocyanine di-(3)-sulfonyl chloride used in Example 16; except that NH₄OH is substituted for the NaOH of Example 16; except that the pH is adjusted to 8 instead of 9; and that 104 gms.

$$(NH_4)_2S_2O_3$$

is substituted for the aqueous Na₂S₅ used in Example 16.

EXAMPLE 19

This example is the same as Example 16 above, except that 125 gms. K₂S₂O₃·H₂O is substituted for the aqueous Na₂S₅ used in Example 16.

For purposes of economy, Na₂S₂O₃ aqueous waste derived from production of sulfur dyes, such as sulfur black dye made from di-nitrophenol, may be employed directly as the source of the Na₂S₂O₃ used in the method of the present invention.

What is claimed is:

1. A process for making vattable, sulfur containing dyestuff comprising the step of heating at 140°–180° C. and pH 7–10 in a sealed pressure vessel until the dyestuff precipitates an excess of a reagent selected from the group consisting of Na₂S₂O₃, K₂S₂O₃, (NH₄)₂S₂O₃ and sodium polysulfide with an aqueous solution of a sulfinate of the phthalocyanine series selected from the group consisting of a sulfinate of phthalocyanine, a sulfinate of copper phthalocyanine and a sulfinate of nickel phthalocyanine, wherein said sulfinate of the phthalocyanine series has 2–4 substituents including an average of 1–3.4 pendant sodium sulfinate groups per phthalocyanine molecule as substituents for hydrogen in the phenylene nuclei of the phthalocyanine and in which any remaining substituents are pendant sodium thiolsulfonate or pendant sodium sulfonate groups.

2. A process as defined in claim 1, and in which said sulfinate has the formula

wherein Pc is the radical of phthalocyanine, copper phthalocyanine or nickel phthalocyanine, $x$ is a number from 1.2–2.3, $y$ is a number from 0.8–2.3, and $x+y$ is a number from 2–4.

3. A method as defined in claim 1, and further characterized in that said sulfinate is

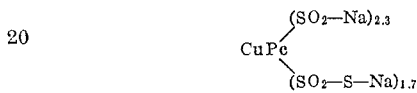

wherein CuPc is the radical of copper phthalocyanine; and further characterized in that said reagent is sodium polysulfide.

References Cited

UNITED STATES PATENTS 2,453,953   11/1948   Wood _____ 260—314.5

JOHN D. RANDOLPH, *Primary Examiner.*

W. A. MODANCE, *Examiner.*

H. I. MOATZ, *Assistant Examiner.*

UNITED STATES PATENT OFFICE
CERTIFICATE OF CORRECTION

Patent No. 3,378,568                              April 16, 1968

Wilson J. Bryan, Jr., et al.

It is certified that error appears in the above identified patent and that said Letters Patent are hereby corrected as shown below:

Column 1, line 61, "equilibrium" should read -- equipment --.

Signed and sealed this 25th day of November 1969.

(SEAL)
Attest:

Edward M. Fletcher, Jr.                      WILLIAM E. SCHUYLER, JR.
Attesting Officer                              Commissioner of Patents